United States Patent [19]

Asano et al.

[11] Patent Number: 5,010,782
[45] Date of Patent: Apr. 30, 1991

[54] POSITION ADJUSTABLE PEDAL ASSEMBLY

[75] Inventors: Yasushi Asano; Yoshimasa Kataumi, both of Shizuoka, Japan

[73] Assignee: Fuji Kiko Company, Ltd., Tokyo, Japan

[21] Appl. No.: 386,401

[22] Filed: Jul. 28, 1989

[30] Foreign Application Priority Data

Jul. 28, 1988 [JP] Japan .................................. 63-188774
Jul. 28, 1988 [JP] Japan .................................. 63-188775
Jul. 28, 1988 [JP] Japan .................................. 63-188776
Jul. 28, 1988 [JP] Japan .................................. 63-188777

[51] Int. Cl.$^5$ ............................................. G05G 1/14
[52] U.S. Cl. ................................... 74/512; 74/513; 74/560
[58] Field of Search ............... 74/512, 513, 560, 522, 74/561, 562

[56] References Cited

U.S. PATENT DOCUMENTS

| | | | |
|---|---|---|---|
| 2,936,867 | 5/1960 | Perry | 74/513 X |
| 3,151,499 | 10/1964 | Roe | 74/512 |
| 3,563,111 | 2/1971 | Zeigler | 74/512 |
| 3,643,524 | 2/1972 | Herring | 74/512 |
| 3,691,868 | 9/1972 | Smith | 74/512 |
| 3,757,604 | 9/1973 | Schroeder | 74/512 |
| 3,861,237 | 1/1975 | Mounts | 74/512 |
| 4,037,487 | 7/1977 | Ahlschwede et al. | 74/512 |
| 4,386,537 | 6/1983 | Lewis | 74/513 X |
| 4,497,217 | 2/1985 | Hansen | 74/512 |
| 4,875,385 | 10/1989 | Sitrin | 74/513 X |

FOREIGN PATENT DOCUMENTS

| | | | |
|---|---|---|---|
| 0256466 | 2/1988 | European Pat. Off. | 74/512 |
| 50-6694 | 5/1973 | Japan | 74/512 |
| 50-34814 | 7/1973 | Japan | 74/512 |

Primary Examiner—Vinh T. Luong
Attorney, Agent, or Firm—Ronald P. Kananen

[57] ABSTRACT

In a position adjustable pedal assembly for a vehicle, a pedal pad position is adjustable in a longitudinal direction of the vehicle. A lever is connected to a stationary bracket for a pivotal movement about a pivot axis and is formed with a linear track extending in the vehicular longitudinal direction. A pedal arm is provided with a pedal pad at its lower end and with a guide member at its upper end and is connected to the lever for the pivotal movement with the lever in response to a depression force applied to the pedal pad. An adjust lever is provided on the lever for a relative movement to the lever and is formed with an arc-shaped track. The relative movement of the adjust lever is caused when the guide member moves within the linear track and simultaneously within the arc-shaped track while the pedal pad position is adjusted. The adjust lever is provided with a connecting member which is movable within another arc-shaped track in response to the relative movement of the adjust lever. Accordingly, when the pedal pad position is adjusted to move the guide member, the relative movement of the adjust lever is caused to vary a position of the connecting member corresponding to a magnitude of the movement of the guide member, i.e., corresponding to the variation in a distance from the pivot axis to the pedal pad. The depression force is applied to a vehicle operation system through the connecting member.

12 Claims, 7 Drawing Sheets

POSITION ADJUSTABLE PEDAL ASSEMBLY

BACKGROUND OF THE INVENTION

1. Field of the Invention

The present invention relates to a position adjustable pedal assembly for a vehicle. More specifically, the present invention relates to an automotive position adjustable pedal assembly to be used such as for brake, accelerator and clutch pedals, wherein a position of the pedal is adjustable in the forward and rearward directions of the vehicle.

2. Description of the Background Art

There has been proposed a pedal assembly which enables a driver to adjust a position of the pedal in the forward and rearward directions of the vehicle according to his or her height. This is required since if the driver's seat is adjusted forwardly or rearwardly to match his or her height, the visual field is varied corresponding to the seat position, which is not preferable in view of safety as well as the driving comfortable. Further, if the driver's seat is moved rearwardly, the leg space for a passenger sitting on the rear seat becomes inevitably narrow. Accordingly, there have been required such a pedal assembly which makes it possible to adjust the position of the pedal forwardly and rearwardly.

In the conventional pedal assembly, however, there arises a problem of a variation in force applied to an operating member which is connected to a vehicle operation system, such as a braking system, an engine throttle valve or a clutch system, according to a position of a pedal pad between its adjustable range. Specifically, if an amount or a distance of pivotal displacement of the pedal pad, i.e. of displacement of the pedal pad in the circumferential direction caused by the depression of the pedal pad by the driver is the same, the force applied to the operating member varies according an adjusted position of the pedal pad due to change in a length of a lever between its pivot axis at its upper end and a pedal pad at its lower end where the depression force is appled by the driver.

This variation forces the driver to operate the pedal pad differently according to the adjusted pedal pad position.

SUMMARY OF THE INVENTION

Therefore, it is an object of the present invention to provide a pedal assembly for a vehicle which enables a position of a pedal pad such as a brake pedal pad, an accelerator pedal pad and a clutch pedal pad to be adjusted forwardly and rearwardly of the vehicle, i,e. in a longitudinal direction of the vehicle, wherein a force applied to an operating member which transmits the appled force to a vehicle operation system such as a braking system, an engine throttle valve and a clutch system, is held substantially constant under the same pivotal displacement distance of the pedal pad caused by a driver's depression action of the pedal, irrespective of the adjusted pedal pad position.

Another object of the present invention is to provide a position adjustable pedal assembly, wherein a required depression force or leg power for depressing the pedal pad by the same distance is maintained substantially constant, irrespective of the adjusted pedal pad position.

A further object of the present invention is to provide a position adjustable pedal assembly, wherein a full depression displacement distance of the pedal pad in the circumferential direction is held substantially constant by using adjustable stopper means, irrespective of the adjusted pedal position.

A still further object of the present invention is to provide a position adjustable pedal assembly, wherein a reaction force applied to components of the pedal assembly in the direction along a length of the vehicle, i.e. in the longitudinal direction of the vehicle to be generated in response to the depression force applied to the pedal pad by the driver is considerably reduced so as to attain the strength of the pedal assembly as well as smooth pedal operation feelings.

To accomplish the above-mentioned and other objects, according to one aspect of the present invention, a position adjustable pedal assembly for a vehicle comprises a stationary bracket fixed to a vehicle body, a lever pivotably connected to the stationary bracket about a pivot axis, a pedal arm with a pedal pad at its lower end, the pedal arm being connected to the lever so as to pivot about the pivot axis along with the lever in response to a depression force applied to the pedal pad, first means provided between the lever and the pedal arm for adjusting a position of the pedal pad in a longitudinal direction of the vehicle, second means for transmitting the depression force from the lever to a vehicle operation system, third means provided between the lever and said second means, for varying a point of application of the depressed force relative to said second means from said lever according to an adjusted pedal pad position.

According to a second aspect of the present invention, the third means varies the point of application of the depressed force relative to the second means from the lever in response to variation in a distance between the first pivot axis and a center of the pedal pad.

According to a third aspect of the present invention, the position adjustable pedal assembly may further includes spring means connected to the stationary bracket at its one end and to the lever at its other end, the spring means stretching or compressing in response to the variation of the distance so as to change its spring force applied to the lever and the pedal arm, the change of the spring force absorbing variation in a required depression force to be applied to the pedal pad, the variation of the required depression force being caused by the variation of the distance.

According to a fourth aspect of the present invention, the position adjustable pedal assembly may further include stopper means provided on the lever, the stopper means having an engaging portion of a shape which has a predetermined curvature, said engaging portion being pivotable according to an adjusted pedal pad position so as to contact with the stationary bracket to prevent a pivotal movement of the lever about the pivot axis exceeding a predetermined value in response to a constant pivotal displacement distance of the pedal pad from its non-depressed position irrespective of the adjusted pedal pad position, the predetermined curvature of the engaging portion being non-constant therealong.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

A first preferred embodiment of a position adjustable pedal assembly will be described with reference to FIGS. 1 to 4, wherein the pedal assembly is applied to a brake pedal.

Figure 1:
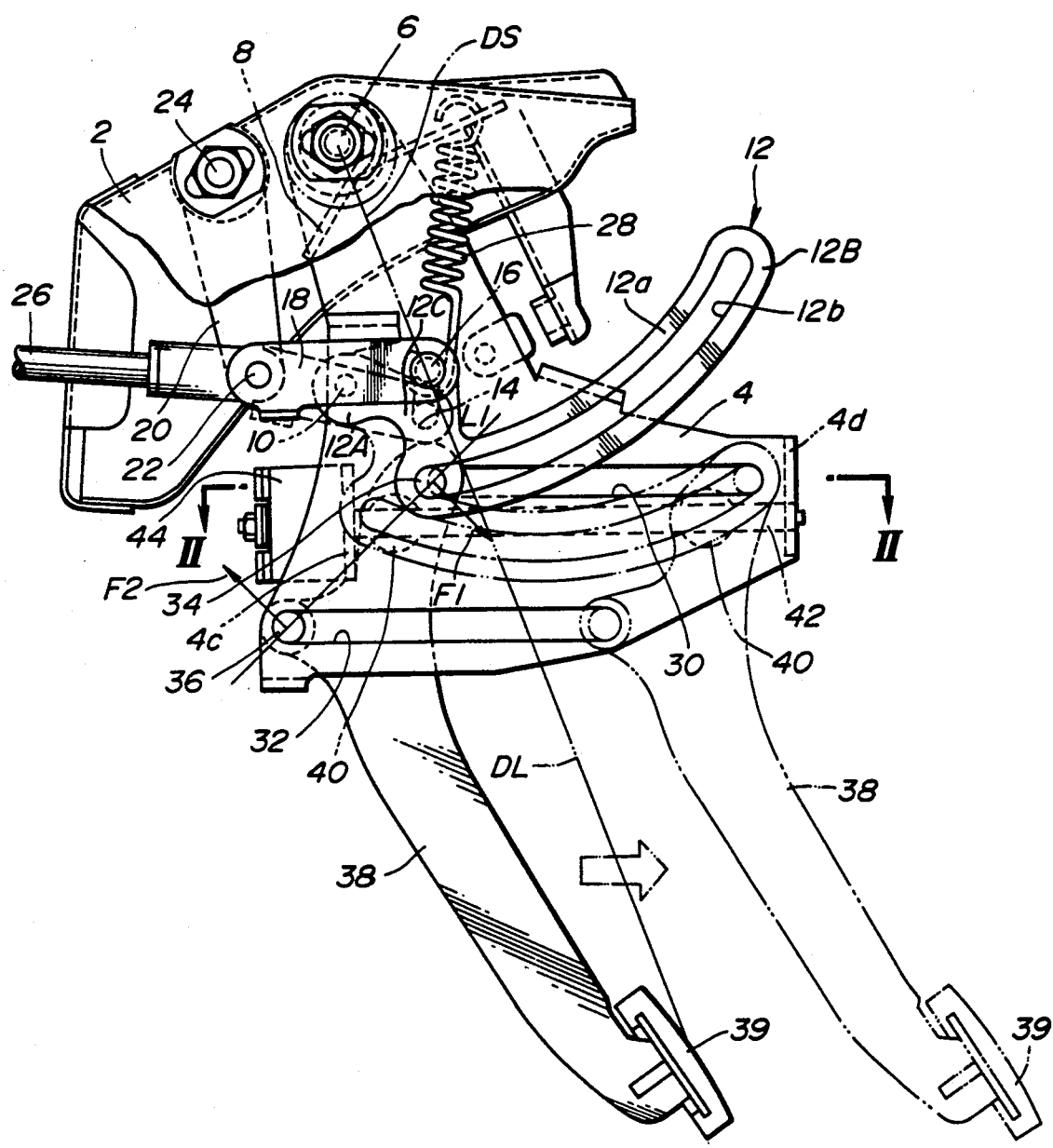
FIG. 1 is a side elevation showing a position adjustable pedal assembly according to a first preferred embodiment of the present invention.
Figure 2:
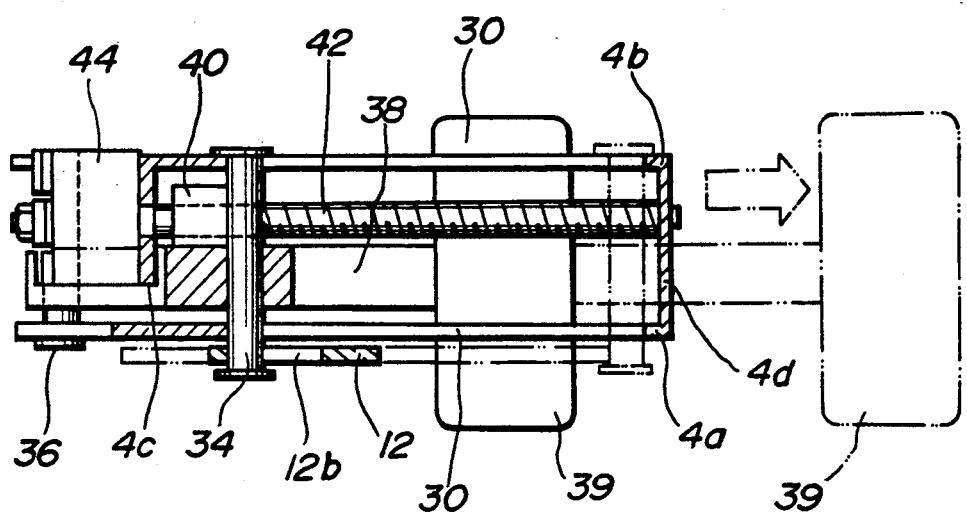
FIG. 2 is a sectional view taken along the line II—II of FIG. 1.

In FIGS. 1 and 2, a stationary bracket 2 is fixed to a dash panel of a vehicle body. A lever 4 generally of a triangular shape is pivotably connected at its upper end to the stationary bracket 2 with a pivot pin 6 (i.e., a first pivot axis). As can be seen from FIG. 2, the lever 4 is generally of a hollow cubic shape having a right side wall 4a, a left side wall 4b, a front wall 4c and a back wall 4d. A return spring 8 is wound onto the pivot pin 6 for urging the lever 4 counterclockwise in FIG. 1 when a depression force is applied by a driver to push the lever 4 clockwise in FIG. 1. A pin 10 is fixedly provided on the right side wall 4a of the lever 4 for pivotably supporting an adjust lever 12. The adjust lever 12 includes a first portion 12A extending generally in a forward direction of the vehicle, a second portion 12B extending generally in a rearward direction of the vehicle and a third portion 12C extending generally vertically to connect the first and second portions 12A and 12B. The lever 4 is formed with a pair of first arc-shaped holes or slots 14 (i.e., a first arc-shaped track) at the right and left side walls 4a and 4b. A first slide pin 16 (i.e., a connecting member) is inserted into the arc-shaped holes 14 for pivotably supporting the adjust lever 12 and one end of a link member 18 on the right side wall 4a. The other end of the link member 18 is pivotably connected to an auxiliary lever 20 through a pivot pin 22 (i.e., a second pivot axis). The auxiliary lever 20 is in turn pivotably connected to the stationary bracket 2 through a pivot pin 24. A brake operating rod 26 is pivotably connected at its one end to the pin 22 to be operated in synchronism with displacement of the link member 18. The operating rod 26 is connected at its other end to a vehicle operation system such as a braking system (not shown).

A tension spring 28 is connected at its lower end to the first slide pin 16 and at its upper end to the stationary bracket 2. In FIG. 1, the tension spring 28 is in a balanced position supporting a weight applied to the first slide pin 16. Accordingly, the return spring 8 is not energized when no depression force is applied to the lever 4. The adjust lever 12 is generally of a Z-shape and is formed with a second arc-shaped hole or slot 12b (i.e., a second arc-shaped track) at its arc-shaped elongate section 12a. A radius of curvature of the arc-shaped hole 12b is not constant therealong, which will be described later.

The right side wall 4a of the lever 4 is formed with a pair of first and second elongate holes or slots 30 and 32 (i.e., the first and second linear tracks) which extend in parallel to each other in the longitudinal direction of the vehicle. Forward ends as well as rearward ends of the elongate holes 30 and 32 are not vertically aligned, respectively, which will be described later. As can be seen from FIG. 2, the left side wall 4b of the lever 4 is also formed with a pair of holes which just correspond to the elongate holes 30 and 32 formed in the right side wall 4a. Second and third slide pins 34 and 36 (i.e., the first and second guide member) are slidably inserted into the elongate holes 30 and 32 of the right and left side walls 4a and 4b, respectively. A pedal arm 38 is inserted into the lever 4 between the right and side walls 4a and 4b and is supported by the slide pins 34 and 36 at differenct locations. The slide pin 34 further extends through the arc-shaped hole 12b of the adjust lever 12. The pedal arm 38 is provided with a pedal pad 39 at its lower end.

A screw nut 40 (i.e., a driven member) is fixed to the pedal arm 38 and a corresponding screw rod 42 (i.e., a drive member) is rotatably mounted to the front and back walls 4c and 4d. The screw nut 40 is of a cylindrical shape and formed with a threaded hole through which the screw rod 42 extends so as to be engaged with each other. An electric motor 44 is fixed to the front wall 4c and is connected to the screw rod 42 for actuating same. Specifically, the motor 44 is energized to rotate in the normal or reverse direction in response to the driver's switching operation. This rotation of the motor causes the screw rod 42 to rotate in the same direction with the motor 42. The screw nut 40 is guided by the rotation of the screw rod 42 to move along the screw rod 42. This movement of the screw nut 40 causes the pedal arm 38 along with the pedal pad 39 to move along the secrew rod 42, with the slide pins 34 and 36 each moving within the corresponding hole 30 or 32 between its forward and rearwad ends, as shown in FIG. 1 by the solid and dotted lines.

Now the operation of the first preferred embodiment will be described hereinbelow.

Figure 3:
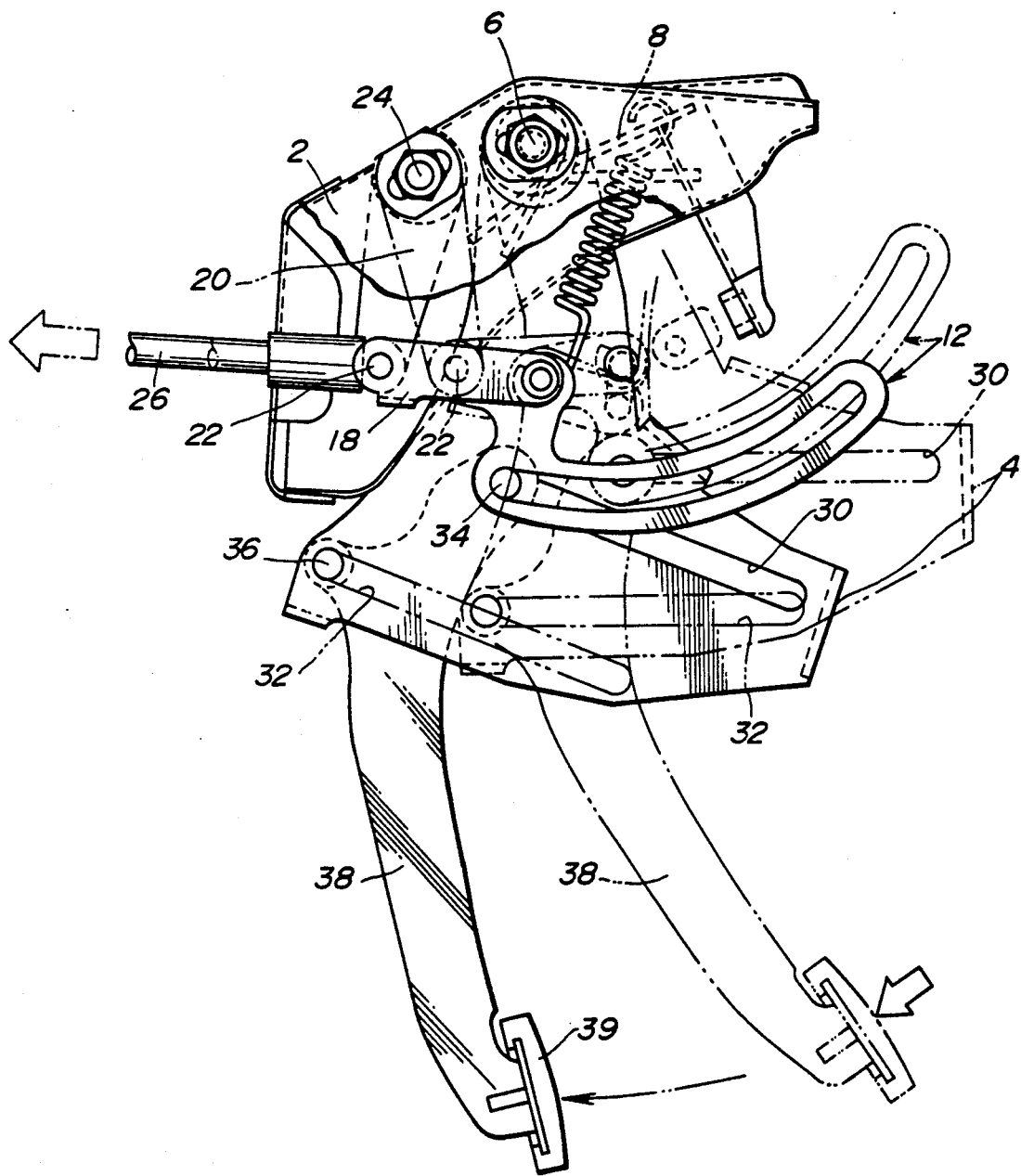
FIG. 3 is a side elevation for showing the operation of the position adjustable pedal assembly of FIG. 1, wherein the pedal pad position is adjusted to its foremost position.

FIG. 3 shows the operation of the position adjustable pedal assembly, wherein the pedal pad 39 is adjusted to its foremost position. Specifically, the slide pins 34 and 36 are positioned at the forward ends of the elongate holes 30 and 32, respectively, and the slide pin 34 is also positioned at the forward end of the arc-shaped hole 12b. When the pedal pad 39 is depressed by the driver, as shown by the solid line in FIG. 3, the pedal arm 38 and the lever 4 pivot about the pivot pin 6 as one integral unit in the clockwise direction. This causes the link member 18 to move forwardly so as to rotate the auxiliary lever 20 about the pivot pin 24 in the clockwise direction. Accordingly, the pin 22 is displaced forwardly to push the operating rod 26 also forwardly so as to transmit the depressed force applied to the brake pedal pad 39 to the vehicle operation system (not shown) through the operating rod 26.

It is to be noted that since a line L1 is inclined at a predetermined angle to the vertical line VL, force F1 and F2 is applied to the slide pins 34 and 36 as shown in FIG. 1 in response to the depressing force applied to the brake pedal pad 39. Accordingly, the force which is to be applied to the slide pins 34 and 36 in a longitudinal direction of the elongate holes 30 and 32 is considerably reduced. On the other hand, if the slide pins 34 and 36 are vertically aligned, the force F1 and F2 is applied to the slide pins 34 and 36 in the direction along the length of the elongate holes 30 and 32. Accordingly, the strength of the assembly becomes less and the operation of the pedal pad 39 becomes jerky since the slide pin 34 is not engaged with any member in the direction along the force F1.

When the brake pedal pad 39 is released from the depression force, the pedal arm 38 and the lever 4 return to the initial position as one integral unit by means of the energized force of the return spring 8 as shown by the dotted line in FIG. 3.

In order to adjust the pedal position away from the foremost position as shown in FIG. 3 to, for example, the rearmost position, the electric motor 44 is energized to rotate in the normal direction by operating the switch (not shown), which causes the screw rod 42 to rotate in the same direction. Accordingly, the screw nut 40 moves along the screw rod 42 rearwardly to slide the slide pins 34 and 36 within the corresponding elongate holes 30 and 32 also rearwardly, as shown by the solid line in FIG. 4 wherein the pedal position is adjusted to its rearmost position. Simultaneously, the slide pin 34 slides within the arc-shaped hole 12b from its forward end to its rearward end, which causes the adjust lever 12 to pivot about the pin 10 in the clockwise direction. This pivotal movement of the adjust lever 12 causes the support pin 16 to move downward within the arc-shaped hole 14. Simultaneously, the link member 18 pivots about the pin 22 in the clockwise direction, which, however, does not cause the auxiliary lever 20 to pivot about the pivot pin 24, i.e. the pin 22 does not move so that no force is applied to the operating rod 26 since a radius of curvature of the arc-shaped hole 14 is the same as a distance between the center of the pin 22 and the center of the support pin 16.

As described before, the radius of curvature of the arc-shaped hole 12b is not constant therealong. Specifically, the radii of curvature of the arc-shaped hole 12b are selected such that when the first slide pin 16 moves downward or upward within the arc-shaped hole 14 in response to the sliding movement of the slide pin 34 within the arc-shaped hole 12b toward its rearward end or its forward end, respectively, a ratio of a distance DS to a distance DL is maintained constant, wherein the distance DS is a distance between the center of the pivot pin 6 and the center of the first slide pin 16 and the distance DL is a distance between the center of the pivot pin 6 and the center of the pedal pad 39. This ratio is maintained constannt irrespective of the position of the slide pin 34 within the arc-shaped hole 12b. Accordingly, the force applied to the operating rod 26 and the required depression force or the leg power are kept constant irrespective of the adjusted pedal position under a condition that a distance of the pivotal displacement of the pedal pad 39 from the non-depressed position is the same.

Though the change in the distance DL causes a change in its center of gravity, which varies the required depression force or leg power, this variation is absorbed by means of the tension spring 28 which stretches or compressed according to the position of the first slide pin 16.

Figure 4:
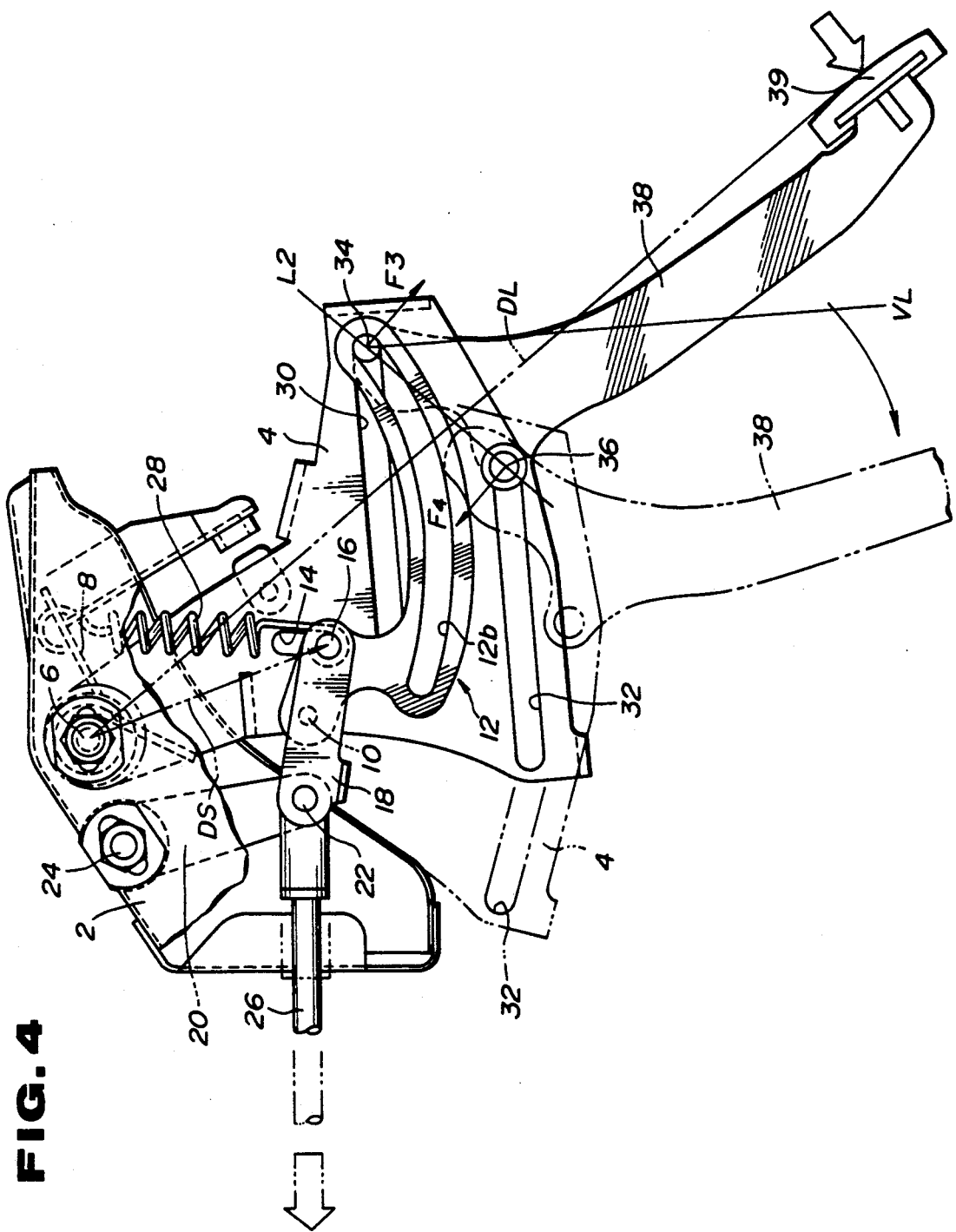
FIG. 4 is a side elevation for showing the operation of the position adjustable pedal assembly of FIG. 1, wherein the pedal pad position is adjusted to its rearmost position.

As seen from FIG. 4, when the pedal pad 39 is depressed by the driver, the pedal arm 38 and the lever 4 pivot about the pivot pin 6 as one integral unit in the clockwise direction to move the link member 18 forward. Simultaneously, the pin 22 moves forward and the auxiliary lever 20 pivots about the pivot pin 24, so that the applied depression force is transmitted to the operating rod 26.

As seen from FIG. 4, a line L2 is inclined at the predetermined angle to the vertical line VL and force F3 and F4 is applied to the slide pins 34 and 36, respectively. This arrangement provides the same effect as described before with reference to FIGS. 1 and 3.

When the pedal pad 39 is released from the depression force, the pedal arm 38 and the lever 4 return to the initial or the non-depressed position as shown by the solid line by means of the energized force of the return spring 8.

In order to return the pedal arm 38 to the position as shown by the solid line in FIG. 1, the electric motor 44 is energized to rotate in the reverse direction.

Now a second preferred embodiment of the position adjustable pedal assembly will be described with reference to FIGS. 5 to 8, wherein the pedal assembly is applied to an accelerator pedal.

Figure 6:
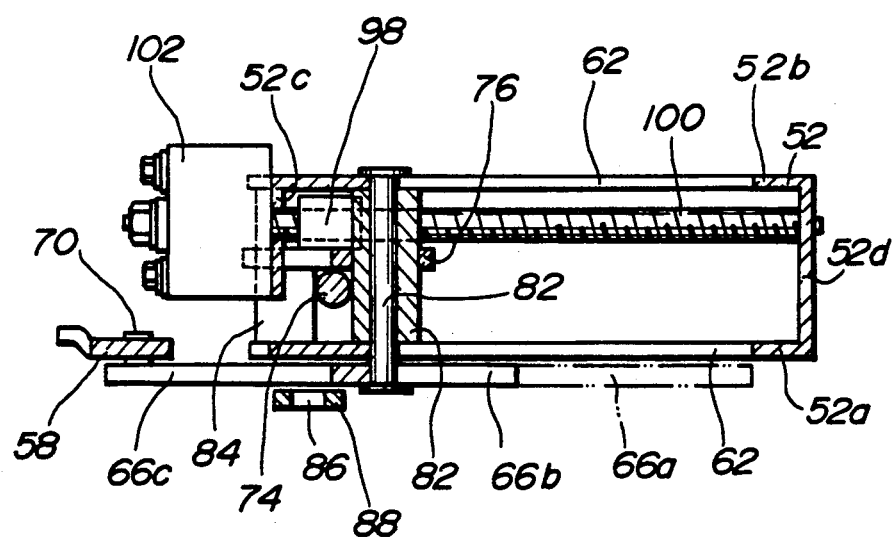
FIG. 6 is a sectional view taken along the line VI—VI of FIG. 5.
Figure 5:
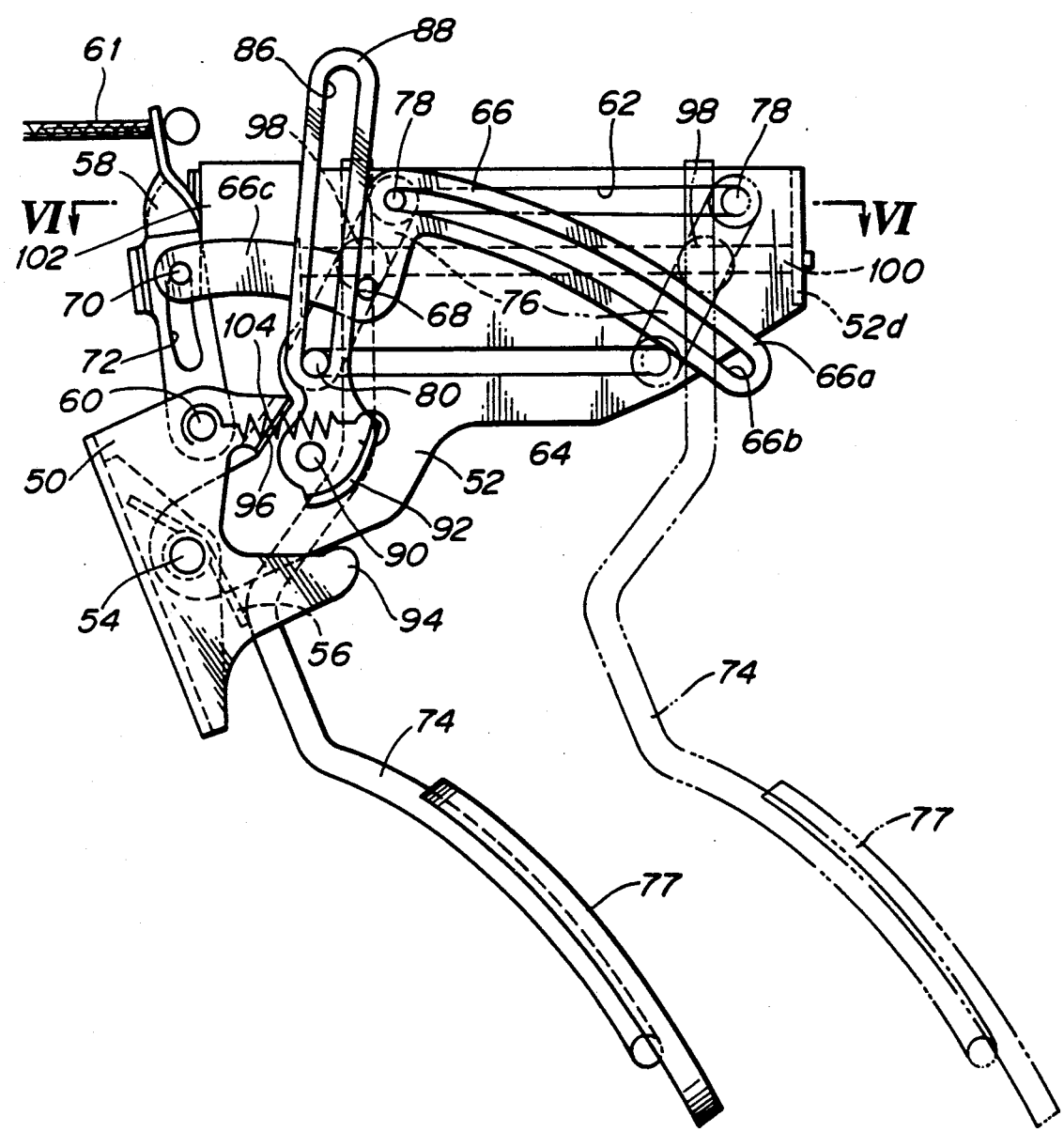
FIG. 5 is a side elevation showing a position adjustable pedal assembly according to a second preferred embodiment of the present invention.

In FIGS. 5 and 6, a stationary bracket 50 is fixed to a dash panel of the vehicle body. A lever 52 is pivotably connected to the stationary bracket 50 by a pivot pin 54 (i.e., a first pivot axis). As can be seen from FIG. 6, the lever 52 is generally of a hollow cubic shape having a right side wall 52a, a left side wall 52b, a front wall 52c and a back wall 52d. A return spring 56 is wound onto the pivot pin 54 for urging the lever 52 counterclockwise in FIG. 5 when a depression force is applied by the driver to push the lever 52 in the clockwise direction.

An operating lever 58 is pivotably connected to the stationary bracket 50 by means of a pivot pin 60 at its lower end and is connected to an operating wire 61 at its upper end. The operating wire is in turn connected to a throttle valve of a vehicle operation system (not shown). The lever 52 is formed with a pair of elongate holes 62 and 64 (i.e., a first and second linear tracks) just as in the first preferred embodiment. An adjust lever 66 is pivotably mounted to the lever 52 by means of a pin 68 which is fixed to the right side wall 52a of the lever 52. The adjust lever 66 is generally of a reversed-Z-shape and is formed with an arc-shaped hole or slot 66b (i.e., a second arc-shaped track) at its arc-shaped section 66a. A radius of curvature of the arc-shaped hole 66b is not constant, which will be described later. The adjust lever 66 has another arc-shaped section 66c which extends in the forward direction and is provided at its forward end with a slide pin 70 (i.e., a connecting member) which engages with an arc-shaped hole or slot 72 (i.e., a first arc-shaped track). A radius of curvature of the arc-shaped hole 72 is the same as a distance between the center of the pin 68 and the center of the slide pin 70 so as to prevent the operating lever 58 from pivoting about the pivot pin 60 when the adjust lever 66 is pivoted about the pin 68 for adjusting the pedal position, which will be described later.

A pedal arm 74 is inserted into the lever 52 between the right and left side walls 52a and 52b and is provided with a bracket 76 at its upper portion. The pedal arm 74 is provided with an accelerator pedal pad 77. The bracket 76 is fixed to the pedal arm 74 and is provided with a pair of slide pins 78 and 80 (i.e., the first and second guide member) at its upper and lower ends, respectively. Collars 82 and 84 are placed between the bracket 76 and the corresponding slide pins 78 and 80 as shown in FIG. 6. The slide pin 78 is inserted through the elongate holes 62 of the lever 52 and further through the arc-shaped hole 66b of the adjust lever 66. The slide pin 80 is inserted through the elongate holes 64 of the lever 52 and further through an elongate hole 86 formed in a stopper lever 88 which is pivotably connected to the lever 52 through a pivot pin 90. The elongate hole 86 is long enough to allow the the slide pin 80 to move within the elongate hole 64 between its forward and rearward ends. The stopper lever 88 is formed with an engaging portion 92 at a side opposite to the elongate hole 86 with respect to the pivot pin 90. The engaging portion 92 is engageable with an arc-shaped projection 94 of the stationary bracket 50, which projection 94 is formed at a lower rearward end of the stationary bracket 50. The engagement of the engaging portion 92 with the arc-shaped projection 94 prevents a clockwise pivotal movement of the lever 52 exceeding a predetermined value which is caused by the depression force applied by the driver. Curvature of the engaging portion 92 is not constant therealong. Specifically, the curvature of the engaging portion 92 is selected such that the engaging portion 92 engages with the arc-shaped projection 94 to stop the clockwise pivotal movement of the lever 52 exceeding the predetermined value in response to a constant distance of the pivotal displacement of the pedal pad 77 irrespective of the adjusted position of the pedal pad 77. The stationary bracket 50 is further formed with a stopper projection 96 at its upper rearward end. The stopper projection 96 is engageable with a corresponding forward end of the lever 52 so as to prevent a counterclockwise pivotal movement of the lever 52 exceeding a predetermined value.

A screw nut 98 (i.e., a driven member) is fixed to the bracket 76 and a corresponding screw rod 100 (i.e., a drive member) is rotatably mounted to the front and back walls 52c and 52d. The screw nut 98 is of a cylindrical shape and formed with a threaded hole through which the screw rod 100 extends so as to be engaged with each other. An electric motor 102 is fixed to the front wall 52c and is connected to the screw rod 100 for actuating same. Specifically, the motor 102 is energized to rotate in the normal or reverse direction in response to the driver's switching operation. This rotation of the motor causes the screw rod 100 to rotate in the same direction with the motor 102. The screw nut 98 is guided by the rotation of the screw rod 100 to move along the screw rod 100. This movement of the screw nut 98 causes the bracket 76, i.e. the pedal arm 74 along with the pedal pad 77 to move along the secrew rod 100, with the slide pins 78 and 80 each moving within the corresponding hole 62 or 64 between its forward and rearwad ends, as shown in FIG. 5 by the solid and dotted lines.

A tension spring 104 is connected to the pivot pin 60 at its forward end and to the stopper lever 88 at its rearward end. The tension spring 104 is in a balanced position supporting a weight applied to the tension spring 104.

Now the operation of the second preferred embodiment will be described hereinbelow.

Figure 7:
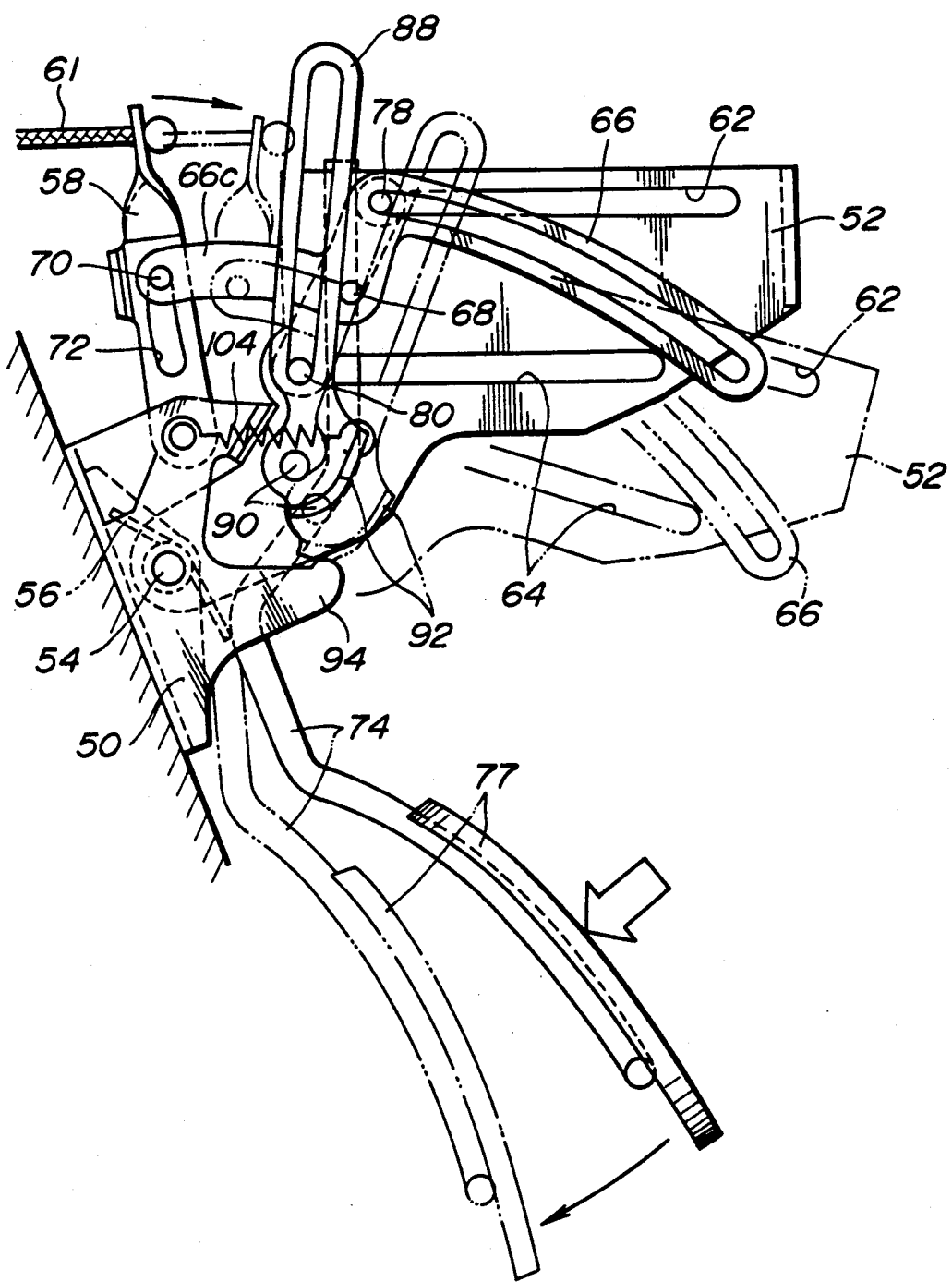
FIG. 7 is a side elevation for showing the operation of the position adjustable pedal assembly of FIG. 5, wherein the pedal pad position is adjusted to its foremost position.

FIG. 7 shows the operation of the position adjustable pedal assembly, wherein the pedal pad 77 is adjusted to its foremost position. Specifically, the slide pins 78 and 80 are positioned at the forward ends of the elongate holes 62 and 64, respectively, and the slide pin 78 is also positioned at the forward end of the arc-shaped hole 66b. When the pedal pad 77 is depressed by the driver, as shown by the dotted line in FIG. 7, the pedal arm 74 and the lever 52 pivot about the pivot pin 54 as one integral unit in the clockwise direction. Simultaneously, the adjust lever 66 pulls the operating lever 58 so that the operating lever 58 pivots about the pivot pin 60 in the clockwise direction to pull the operating wire 61 in the rearward direction, which in turn operates the throttle valve of the vehicle operation system (not shown).

When the clockwise pivotal movement of the lever 52 and the pedal arm 74 exceeds the predetermined value, the engaging portion 92 of the stopper lever 88 engages with the arc-shaped projection 94 of the stationary bracket 50 to prevent the further pivotal movement of the lever 52 and the pedal arm 74. On the other hand, when the depression force is released, the lever 52 and the pedal arm 74 pivot about the pivot pin 54 counterclockwise by means of the energized force of the return spring 56 to return to the initial position as shown by the solid line in FIG. 7.

In order to adjust the pedal position away from the foremost position as shown in FIG. 7 to, for example, the rearmost position, the electric motor 102 is energized to rotate in the normal direction by operating the switch (not shown), which causes the screw rod 100 to rotate in the same direction. Accordingly, the screw nut 98 moves along the screw rod 100 rearwardly to slide the slide pins 78 and 80 through the bracket 76 within the corresponding elongate holes 62 and 64 also rearwardly, as shown by the solid line in FIG. 8 wherein the pedal position is adjusted to its rearmost position. Simultaneously, the slide pin 78 slides within the arc-shaped hole 66b from its forward end to its rearward end, which causes the adjust lever 66 to pivot about the pin 68 in the counterclockwise direction. This pivotal movement of the adjust lever 66 causes the the slide pin 70 to move downward within the arc-shaped hole 72. The sliding movement of the slide pin 70 within the arc-shaped hole 72 does not cause the operating lever 58 to pivot about the pivot pin 60 so that no force is applied to the operating wire 61 since a radius of curvature of the arc-shaped hole 72 is the same as a distance between the center of the slide pin 70 and the center of the pivot pin 68.

As described before, the radius of curvature of the arc-shaped hole 66b is not constant therealong. Specifically, the radii of curvature of the arc-shaped hole 66b are selected such that when the slide pin 70 moves downward or upward within the arc-shaped hole 72 in response to the sliding movement of the slide pin 78 within the arc-shaped hole 66b toward its rearward end or its forward end, respectively, a distance between the center of the pivot pin 60 and the center of the slide pin 70 becomes in reverse proportion to a distance between the center of the pivot pin 54 and the center of the pedal pad 77. Accordingly, the force applied to the operating wire 61 and the required depression force or the leg power are kept constant irrespective of the ajusted pedal position under a condition that a distance of the pivotal displacement of the pedal pad 77 from the non-depressed position is the same.

As the slide pin 80 moves rearward within the elongate hole 64, the stopper lever 88 starts to pivot about the pivot pin 90 in the clockwise direction, which causes the engaging portion 92 also to pivot about the pivot pin 90. As described before, the curvature of the engaging portion 92 is not constant therealong. Specifically, the curvature of the engaging portion 92 is selected to allow the engaging portion 92 to contact with the arc-shaped projection 94 when the pedal pad 77 performs a pivotal displacement of a predetermined constant distance from the non-depressed position of the pedal pad 77, irrespective of an adjusted pedal position.

Figure 8:
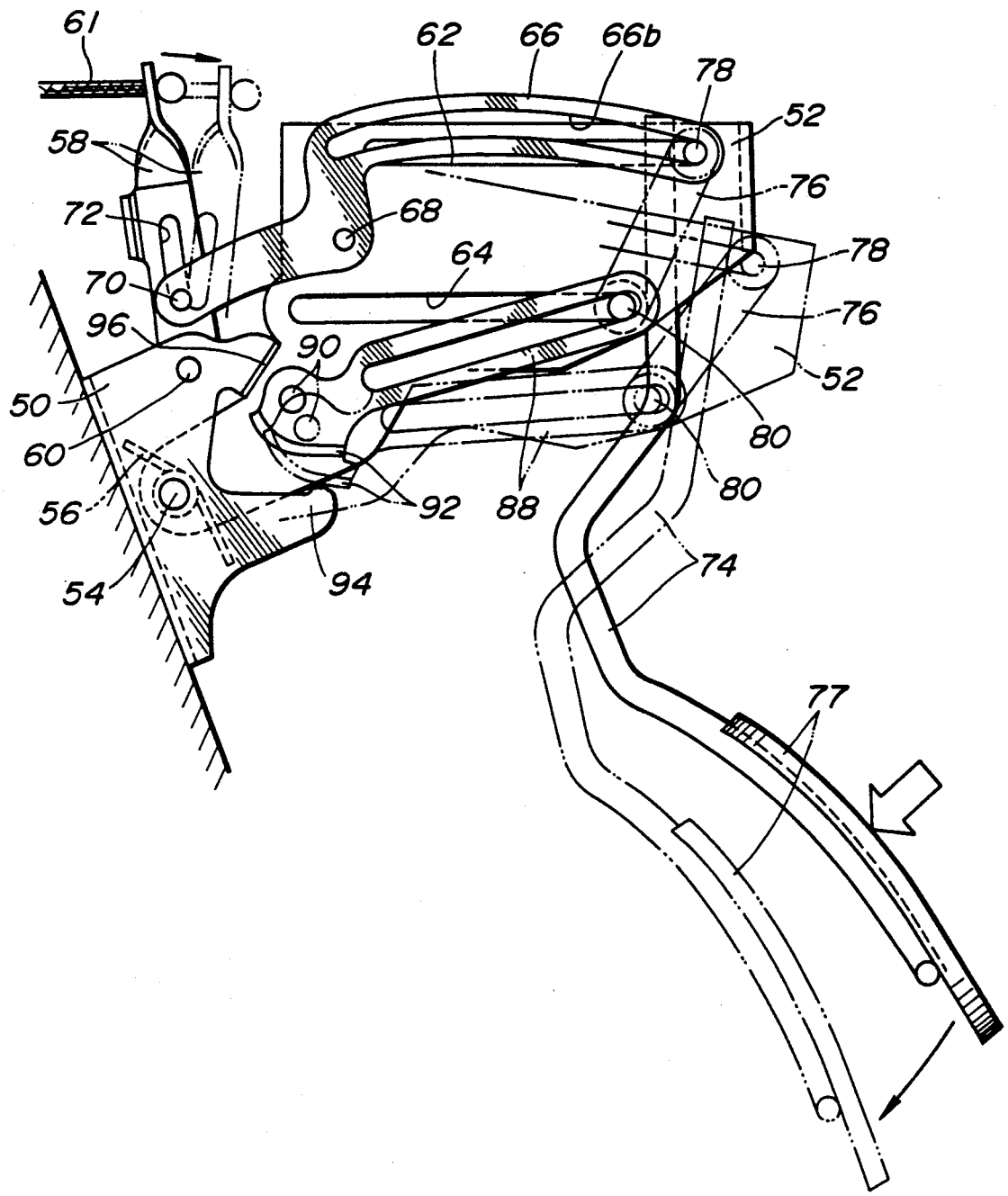
FIG. 8 is a side elevation for showing the operation of the position adjustable pedal assembly of FIG. 5, wherein the pedal pad position is adjusted to its rearmost position.

As seen from FIG. 8, when the pedal pad 77 is depressed by the driver, the pedal arm 74 and the lever 52 pivot about the pivot pin 54 as one integral unit in the clockwise direction to actuate the operating lever 58 through the adjust lever 66. Accordingly, the operating lever 58 pivots about the pivot pin 60 clockwise to pull the operating wire 61 rearwardly, so that the throttle valve of the vehicle operation system is in turn actuated. The pivotal movement of the lever 52 and the pedal arm 74 exceeding the predetermined value is prevented by means of the engagement between the engaging portion 92 and the arc-shaped projection 94. When the pedal pad 77 is released from the depression force, the pedal arm 74 and the lever 52 pivot about the pivot pin 54 counterclockwise to return to the initial or non-depressed position as shown by the solid line in FIG. 8 by means of the energized force of the return spring 56. A further counterclockwise movement is prevented by means of the engagement between the stopper projection 96 and the forward end of the lever 52.

In order to return the pedal arm 74 to the position as shown by the solid line in FIG. 5, the electric motor 102 is energized to rotate in the reverse direction.

As in the first preferred embodiment, the center of the slide pin 78 and the center of the slide pin 80 are not vertically aligned, which can provide the same effect as described in the first preferred embodiment.

It is to be understood that the invention is not to be limited to the embodiments described above, and that various changes and modifications may be made without departing from the spirit and scope of the invention as defined in the appended claims.

What is claimed is:

1. A position adjustable pedal assembly for a vehicle comprising:
   a stationary bracket fixed to a stationary portion of the vehicle;
   a lever connected to said stationary bracket for a pivotal movement relative to said stationary bracket about a first pivot axis;
   a pedal arm with a pedal pad at its lower end, said pedal arm connected to said lever for pivotal movement with said lever as one integral unit in response to a depression force applied to the pedal pad;
   pedal position adjusting means including a drive member and a driven member, said drive member adapted to be activated by a vehicle driver's operation, said driven member mounted on said pedal arm to be selectively driven by said drive member to move in a longitudinal direction of the vehicle along with said pedal arm relative to said lever so as to adjust a position of the pedal pad in the longitudinal direction of the vehicle;
   an adjust lever provided on said lever, said adjust lever being allowed a relative movement to said lever and having a connecting member which is adapted to move within a first arc-shaped track in response to the relative movement of said adjust lever;
   a second arc-shaped track formed on said adjust lever;
   a first linear track formed on said lever and extending in the longitudinal direction of the vehicle;
   a first guide member provided on said pedal arm, said first guide member adapted to move within said first linear track, and simultaneously within said second arc-shaped track formed on said adjust lever when said pedal arm is driven to move in the longitudinal direction of the vehicle via said pedal position adjusting means, said movement of the first guide member changing a distance from said first pivot axis to said pedal pad corresponding to a magnitude of the movement of said first guide member and simultaneously allowing said relative movement of the adjust lever to change a position of said connecting member within said first arc-shaped track corresponding to said magnitude of the movement of said first guide member; and
   operating member means connected to said connecting member for receiving therefrom the depression force applied to said pedal pad via said pedal arm and said lever and for transmitting said depression force to a vehicle operation system to operate same.

2. The position adjustable pedal assembly as set forth in claim 1, wherein said relative movement of the adjust lever changes the position of said connecting member to provide a predetermined ratio relationship between said distance and a distance from said first pivot axis to said connecting member.

3. The position adjustable pedal assembly as set forth in claim 2, wherein said drive member includes a screw rod rotatably supported on said lever and extending in parallel to said first linear track, and said driven member includes a nut fixed to said pedal arm and having a threaded hole therethrough which receives said screw rod therethrough for mutual engagement therebetween, said nut being allowed to move in the longitudinal direction of the vehicle along with said pedal arm when said screw rod is actuated to rotate.

4. The position adjustable pedal assembly as set forth in claim 2, wherein said connecting member includes a first slide pin connected to said adjust lever, and said first arc-shaped track includes a first arc-shaped slot formed in said lever, said first slide pin being allowed to slide within said first arc-shaped slot in response to said relative movement of the adjust lever.

5. The position adjustable pedal assembly as set forth in claim 4, wherein said first pivot axis is provided at an upper end of said lever, and said first arc-shaped slot is oriented substantially in a vertical direction to provide said predetermined ratio relationship in which a ratio between said distance from the first pivot axis to the pedal pad and said distance from the first pivot axis to the first slide pin is maintained constant irrespective of an adjusted position of the pedal pad which is adjusted by said pedal position adjusting means.

6. The position adjustable pedal assembly as set forth in claim 5, further comprising spring means connected to said stationary bracket at its upper end and to said first slide pin at its lower end, said spring means stretching or compressing in response to said movement of said first slide pin within said first arc-shaped slot so as to change its spring force applied to said pedal pad via said slide pin, said lever and said pedal arm, said change of the spring force absorbing variation in a required depression force to be applied to said pedal pad, said variation in the required depression force being caused by variation in said distance from the first pivot axis to the pedal pad due to the adjustment of the pedal pad position via said pedal position adjusting means.

7. The position adjustable pedal assembly as set forth in claim 5, wherein said operating member means includes a link member and an operating rod, said link member being connected to said first slide pin at its rearward end and connected to said operating rod at its forward end for a pivotal movement relative to said operating rod about a second pivot axis, and wherein said first arc-shaped slot has a radius of curvature which is the same as a distance from the first slide pin to said second pivot axis for preventing displacement of the operating rod while the first slide pin moves within said first arc-shaped slot due to the adjustment of said pedal pad by means of said pedal position adjusting means.

8. The position adjustable pedal assembly as set forth in claim 7, wherein radii of curvature of said second arc-shaped track formed on said adjust lever are preselected to maintain said distance ratio to be constant irrespective of a position of said first guide member within said second arc-shaped track.

9. The position adjustable pedal assembly as set forth in claim 8, wherein said first guide member is a second slide pin which is fixed to said pedal arm at its portion opposite to said pedal pad, and said first linear track is a first linear slot which is formed in said lever, and wherein said second slide pin is engaged into said first linear slot and further into said second arc-shaped slot formed in said adjust lever.

10. The position adjustable pedal assembly as set forth in claim 9, further comprising a second guide member in a form of a third slide pin fixed to said pedal arm below said second slide pin, said second and third slide pins being vertically disaligned from each other, and a second linear track in a form of a second linear slot formed in said lever below said first linear slot, said first and second linear slots extending in parallel to each other vertically disaligned from each other, said third slide pin being engaged into said second linear slot for a sliding movement therewithin when said pedal arm is driven to move in the longitudinal direction of the vehicle.

11. A position adjustable pedal assembly for a vehicle comprising:
a stationary bracket fixed to a stationary portion of the vehicle;
a lever connected to said stationary bracket for a pivotal movement relative to said stationary bracket about a first pivot axis;
a pedal arm with a pedal pad at its lower end, said pedal arm connected to said lever for pivotal movement with said lever as one integral unit in response to a depression force applied to the pedal pad;
pedal position adjusting means including a drive member and a driven member, said drive member adapted to be activated by a vehicle driver's operation, said driven member mounted on said pedal arm to be selectively driven by said drive member to move in a longitudinal direction of the vehicle along with said pedal arm relative to said lever so as to adjust a position of the pedal pad in the longitudinal direction of the vehicle;
an adjust lever being generally of a Z-shape having a first portion extending generally in a forward direction of the vehicle, a second portion extending generally in a rearward direction of the vehicle and a third portion extending generally vertically to connect said first and second portions, said first portion being connected to said lever at its forward end for a pivotal movement relative to said lever and being connected to a first slide pin at its rearward end, said first slide pin engaging into a first arc-shaped slot formed in said lever for sliding movement therewithin in response to the pivotal movement of said first portion, said second portion being formed with a second arc-shaped slot having a predetermined curvature;
operating member means including a link member and an operating rod, said link member being pivotally connected to said first slide pin at its rearward end and pivotably connected to said operating rod at its forward end for receiving the depression force from said first slide pin and for transmitting the depression force to said operating rod to operate a vehicle operation system; and
said pedal arm provided with a second slide pin at its upper portion which is inserted into a first elongate slot formed in said lever and extending in the longitudinal direction of the vehicle, and into said second arc-shaped slot such that when said second slide pin slides within said first elongate slot and said second arc-shaped slot in the longitudinal direction of the vehicle so as to adjust the pedal pad position, the cooperation of the second slide pin and the second arc-shaped slot forces said first slide pin to slide within said first arc-shaped slot so as to vary a point of application of the depressed force relative to said link member via said first slide pin, said first arc-shaped slot having a predetermined curvature such that the sliding movement of said first slide pin within said first arc-shaped slot is prevented from displacing said operating rod.

12. The position adjustable pedal assembly as set forth in claim 11, wherein said lever is further formed with a second elongate slot below said first elongate slot, said second elongate slot extending in parallel to said first elongate slot, forward and rearward ends of said first and second elongate slots are vertically disaligned, respectively, and said pedal arm is further provided with a third slide pin below said second slide pin, said third slide pin being inserted into said second elongate slot for sliding movement therewithin, said second and third slide pins being vertically disaligned from each other.

* * * * *